United States Patent [19]

Leon

[11] Patent Number: 5,396,167
[45] Date of Patent: Mar. 7, 1995

[54] METHOD FOR REMOTELY DETERMINING OPERABILITY OF MOTOR OPERATED VALVES

[75] Inventor: Robert L. Leon, Maple Glen, Pa.

[73] Assignee: Liberty Technologies, Inc., Conshohocken, Pa.

[21] Appl. No.: 71,421

[22] Filed: Jun. 3, 1993

[51] Int. Cl.⁶ .................... G01R 31/00; G01M 19/00
[52] U.S. Cl. ..................... 324/73.1; 73/168; 324/772; 364/551.01
[58] Field of Search .............. 324/158 MG, 73.1; 73/168, 862.29, 862.31; 364/550, 551.01

[56] References Cited

U.S. PATENT DOCUMENTS

| | | | |
|---|---|---|---|
| 4,690,003 | 9/1987 | McNennamy et al. | 73/168 |
| 5,000,040 | 3/1991 | Charbonneau et al. | 73/168 |
| 5,029,597 | 7/1991 | Leon | 73/168 |

*Primary Examiner*—Ernest F. Karlsen
*Attorney, Agent, or Firm*—Panitch Schwarze Jacobs & Nadel

[57] ABSTRACT

A method is disclosed for determining operability of a motor operated valve combination including a valve having a valve stem, a valve disc, a valve seat, and a motor operator having a motor drive interconnecting the motor to the valve stem for movement of the valve disc toward and into engagement with the valve seat to close the valve and a control switch for deactivating the motor. The method comprises the steps of sensing the real motor power of the motor as a function of time during valve closing with zero differential pressure applied to the valve at a first time. From the sensed information, the rate of motor power build-up is determined after the onset of valve wedging during valve closing at the first time. The real motor power of the motor is again sensed as a function of time during valve closing with zero differential pressure applied to the valve at a second time which is subsequent to the first time. The rate of motor power build-up after the onset of valve wedging during valve closing at the second time is determined from the sensed information. The rate of motor power build-up after the onset of valve wedging at the first and second times is compared as an indication of lubrication change within the valve between the first and second times.

5 Claims, 3 Drawing Sheets

METHOD FOR REMOTELY DETERMINING OPERABILITY OF MOTOR OPERATED VALVES

FIELD OF THE INVENTION

The present invention relates generally to motor operated valve combinations and, more particularly, to a method for remotely determining operability including thrust margin and stem lubrication of a motor operated valve.

BACKGROUND OF THE INVENTION

Motor operated valve combinations or valves are commonly used in nuclear and other power plants to perform routine opening and closing of water and steam lines and, more importantly, for those valves designated as safety related, to perform such openings or closings to assure the prompt, safe shutdown of the plant under accident or other emergency or abnormal operating conditions. For those valves of this class whose safety function is to close a water, steam or other line, it is important that the valve achieve full or complete closure when called upon to do so. Most motor operated valves in use today are controlled by a torque switch which shuts off or stops the operation of the operator motor when a predetermined valve actuator torque limit is reached and a spring pack or other component moves in response to actuator torque in excess of the limit to trip or actuate the torque switch. Since the torque switch displacement is approximately proportional to the actuator torque above some preload torque, and since the actuator torque is approximately proportional to the stem force, the torque switch displacement set point can be and generally is used to turn off the motor at approximately the valve stem force required to fully close the valve. A certain amount of stem thrust is also required for a motor operated valve (MOV) to close against differential pressure. The required thrust can be calculated as the sum of the packing friction force, the stem rejection force, and the differential pressure force. The packing friction force is the force required to push the value stem through the packing which has been compressed against the stem to prevent leakage. The stem rejection force is the internal pressure force trying to spit out or reject the valve stem. It is equal to the internal line pressure times the cross sectional area of the stem. The differential pressure force is the friction force opposing the inward movement of the valve disc as it is pushed in by the valve stem to close off the opening of the valve. It is equal to the differential pressure across the valve times the effective area of the valve disc times the coefficient of friction of the valve disc against the downstream seat, this coefficient of friction is often referred to as the valve factor.

A control switch, typically the torque switch, is adjusted to trip and thereby turn off the motor at a stem thrust level which is generally higher than the computed required closure thrust so as to provide a comfortable thrust margin. A thrust verification test must be run at the valve to determine the actual thrust applied to the valve stem at control switch trip (CST), making sure the actual thrust exceeds the computed required closure thrust by a comfortable margin. The at-the-valve test is repeated periodically to insure that degradations have not reduced the level of the thrust being developed at CST. The most likely such valve degradation which may occur is lubrication degradation, which increases the coefficient of friction between the threads of the valve stem and the threads of the stem nut that drives the valve stem causing the motor actuator to develop less stem thrust for the given amount of torque at the established torque switch trip setting. Between each at-the-valve periodic thrust verification test, maintenance personnel typically have no way of knowing whether lubrication degradation has occurred, and if it has, by how much it may have reduced the stem thrust developed at the established CST.

The present invention couples results from a specified remote test with results of a previous at-the-valve thrust verification test, to provide a method for determining the degree of lubrication degradation which has occurred, and for determining the resulting new thrust margin which must be evaluated for sufficiency to ensure valve closure. The present invention combines the results of two tests of a motor operated valve separated by a period of time sufficient for lubrication degradation to have possibly occurred. In the first test performed at the valve, both a stem thrust vs time trace and a motor power vs time trace are concurrently developed as the closing valve seats. In the second test, which may be performed at a location remote from the valve, only the motor power vs time trace is developed as the closing valve seats. The motor power trace can be developed from remotely located sensors preferably at the motor control center.

Lubrication degradation is determined from the change, first test to second test, in the time rate of motor power build-up between the onset of valve wedging and torque switch trip. The thrust margin, defined as the increase in stem thrust between the onset of wedging and torque switch trip, is determined from the time between the onset of valve wedging and torque switch trip, first test or second test, multiplied by the time rate of thrust build-up, as determined from the first test, after the onset of wedging. As will be discussed, the time rate of thrust build-up after the onset of wedging is not significantly affected by lubrication degradation, or by the rate of thrust build-up before the onset of wedging, sometimes referred to as the rate of loading or load sensitive behavior.

SUMMARY OF THE INVENTION

Briefly stated, the present invention comprises a method for determining operability of a motor operated valve combination including a valve having a valve stem, a valve disc, a valve seat, and a motor operator having a motor drive means interconnecting the motor to the valve stem for movement of the valve disc toward and into engagement with the valve stem to close the valve and a control switch for deactivating the motor. The method comprises the steps of sensing the real motor power of the motor as a function of time during valve closing with zero differential pressure applied to the valve at a first time. Next, determining from the sensed information the rate of motor power build up after the onset of valve wedging. The real motor power of the motor is sensed as a function of time during valve closing with zero differential pressure applied to the valve at a second time which is subsequent to the first time. From the sensed information, the rate of motor power build-up is determined after the onset of valve wedging during valve closing at the second time. The rate of motor power build-up after the onset of wedging is compared at the first and second times as an indication of lubrication change within the valve between the first and second times.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangement and instrumentalities shown. In the drawings.

DETAILED DESCRIPTION OF PREFERRED EMBODIMENT

Figure 1:
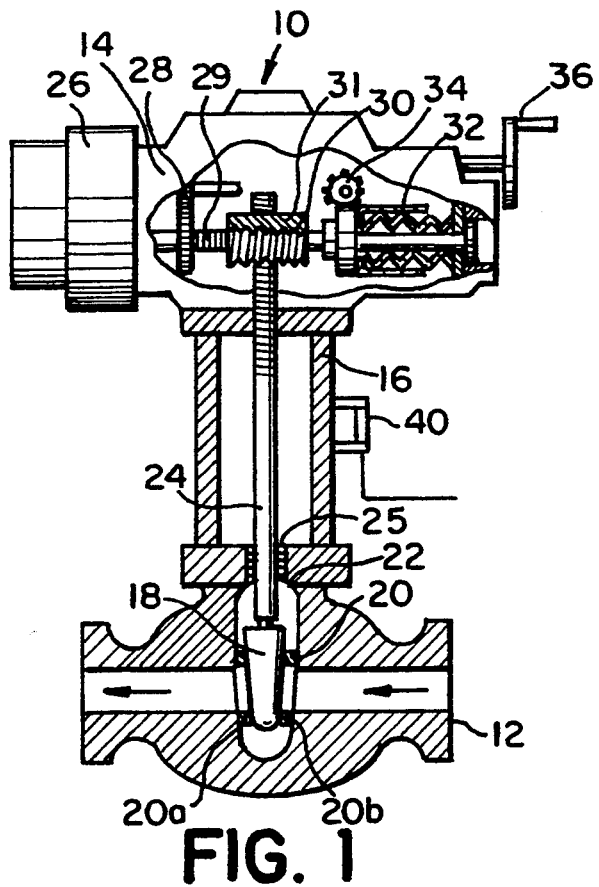
FIG. 1 is an elevation view of a motor operated gate valve shown partially in section and partially broken away, with a preferred embodiment of a yoke mounted thrust sensor for measuring the valve stem thrust as the motor operated valve is stroked in accordance with the present invention.

Referring now in greater detail to the drawings, in which like numerals indicate like elements throughout, there is shown in FIG. 1, an elevation view, partially broken away and partially in section, of a motor operated gate valve combination or valve 10. The motor operated gate valve 10 is a type which is generally well known in the art and is commercially available from a variety of sources. The motor operated gate valve 10 includes a valve member 12 and a valve operator 14 which are connected together by a valve yoke 16. The valve member or valve 12 includes a movable valve member or disc 18, a fixed valve seat 20 including a downstream seat ring 20a and an upstream seat ring 20b, and a fixed valve backseat 22. The valve disc 18 is movable between a "seated" position (not shown) in which it fully and firmly engages the entire valve seat 20 thereby fully closing the valve 12 and a "backseated" position (not shown) in which it engages the valve backseat 22 thereby fully opening the valve 12. As shown in FIG. 1, the valve disc 18 is in an intermediate position part way between the seated and backseated positions but closer to the seated position.

The valve disc 18 moves between the seated and backseated positions by the action of a valve stem 24, one end of which is secured to the valve disc 18. The valve stem 24 extends through suitable openings in the valve 12 and valve yoke 16 with the other end extending into the valve operator 14 as shown. Where the valve stem 24 extends through the valve 12, it is sealed against leakage by packing material 25.

The valve operator 14 contains a motor, in the present embodiment an electric motor, which in the present embodiment is shown as being a three phase A.C. motor. The output shaft of the motor 26 is connected through suitable reduction gears 28 to a splined worm shaft 29 whose splines force a worm 30 that surrounds it to rotate with it, and the worm in turn drives a worm gear 31. The worm gear 31 surrounds and is drivingly engaged with a drive sleeve and stem nut (not shown). The stem nut threadingly engages Acme type threading on the upper end of the valve stem 24. Since the stem nut is restrained from axial movement and the valve stem 24 is restrained from rotating, rotation of the stem nut results in axial movement of the valve stem 24. The direction of movement of the value stem 24 depends upon the direction of movement of the output shaft of the motor 26 and the corresponding direction of rotation of the stem nut. Of course, the axial movement of the valve stem 24 results in corresponding movement of the value disc 18 to open or close the valve 12. During the valve opening or closing operation, both thrust and torque exist between the valve stem 24 and the stem nut as a result of the Acme threads. As the valve disc 18 engages the valve seat 20 the compressive stem thrust increases, generating a reaction torque on the stem nut, drive sleeve and worm gear 31 which shows up as an axial force on the worm 30.

The worm 30 which can move axially along the splines of the worm shaft 29 is connected at its distal (rightmost) end to a spring pack 32 which allows the worm 30 to move proportional to the reaction torque, the proportionality factor determined by the stiffness of the spring pack 32. A separate small gear 34 is also connected to the spring pack 32. The gear 34, in turn, is connected to a torque switch (not shown) housed in switch compartment (also not shown), along with standard limit switches (not shown). The torque switch is used for deactivating or stopping the motor 26, referred to as torque switch trip, when the gear 34 turns a selectable preset amount as a result of the displacement of the spring pack 32. Since the generated stem torque is approximately proportional to the stem thrust, the torque switch is commonly adjusted to stop the motor 26 at the stem thrust desired for proper full valve closure.

As the valve operator 14 operates to close the valve 12, it develops both closing torque and compressive thrust on the valve stem 24 through the action of the Acme threads on the valve stem 24 and stem nut. The ratio of closing torque to compressive thrust, in foot-pounds per pound, is called the stem factor and it is a function of the stem 24 and stem nut thread geometry and the lubrication or lack thereof between them. For most stem geometries lubrication degradation, as a result of lubricant squeezing out in use or as a result of the lubricant hardening with age, can result in a doubling of the stem factor which would result in a corresponding halving of the developed stem thrust at torque switch trip. Thus lubrication degradation can significantly reduce the expected thrust delivered by the operator 14, and hence there is a very real need to periodically test a motor operated valve 10 to verify proper thrust at torque switch trip. Because thrust measurements can only be made at the valve 12, periodic verification testing has been historically done "at-the-valve". Such periodic testing can create a period of uncertainty (i.e., between testings) for some very important valves, such as the valves in containment at nuclear power plants which are inaccessible and, therefore, not available for such at-the-valve testing for up to eighteen months between the refueling outages.

Additionally, it is usually difficult to test such valves with the actual required differential pressure across the valve, so a zero differential pressure test is typically conducted at-the-valve to assure that the valve operator 14 delivers sufficient closing thrust to meet, and exceed, the closing thrust calculated to fully seat the value disc 18 on the valve seat 20, fully closing the valve 12 in the expected or required differential pressure conditions.

For measuring the stem thrust, a yoke mounted force sensor 40 can be used as shown in FIG. 1 because it is difficult to measure forces from the stem directly and the same force that exists on the stem 24 also exists on the yoke 16. The sensor 40 and its calibration are described in detail in the inventor's U.S. Pat. No. 4,805,451 which is incorporated herein by reference. Complete details of the structure and operation of the force sensor 40 may be obtained by reference to the cited patent particularly FIGS. 4-6 and the corresponding portions of the specification, and need not be presented herein for a complete understanding of the present invention. Suffice it to say that the force sensor 40 effectively senses (through the valve yoke 16) forces experienced by the valve stem 24 and generates electrical signals which are proportionally related to the valve stem forces, and thus changes in those electrical signals are proportional to changes in valve stem thrust during closing of the valve 12. The analog electrical signals from the force sensor 40 are suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer for storage, and subsequent display as a stem thrust trace, or stem thrust as a function of time.

It will be appreciated by those skilled in the art that while in the presently preferred embodiment, the force sensor 40 is shown and described as being mounted on the valve yoke 16, the same force sensor 40 or another force sensor (not shown) mounted on the valve yoke 16 or elsewhere could serve the function of the present invention. Thus the present invention is not limited to a particular location for the force sensor 40, nor is it limited to a particular type of force sensor 40 for developing the stem thrust trace as a function of time.

Figure 2:
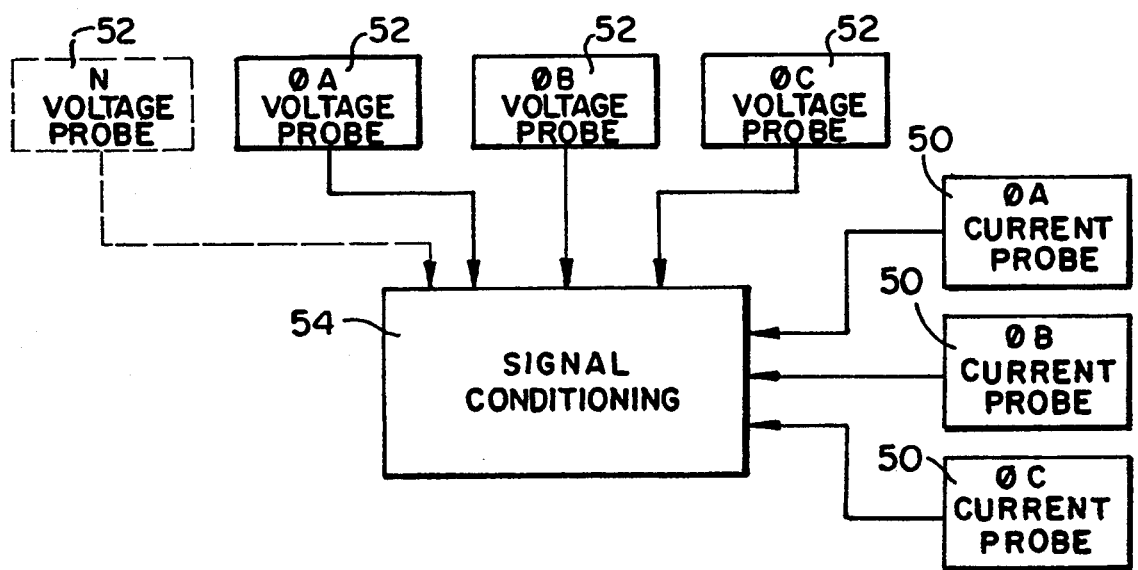
FIG. 2 is a schematic block diagram representation of a preferred embodiment of circuitry employed at a motor control center for the motor operated valve of FIG. 1 to measure the motor power as the motor operated valve is stroked.

For measuring the motor power, three clamp-around Hall effect type current probes 50 of a type well known in the art, and three or four (depending on delta or wye three phase wiring configurations) clamp-on voltage probes 52, also of a type well known in the art, are utilized at the motor control center as shown functionally in FIG. 2. The current probes 50 and voltage probes 52 provide sufficient information to compute real (as opposed to apparent or reactive) motor power as a function of time. The analog electrical signals from the three current probes, and the three or four voltage probes are suitably amplified by signal conditioning circuits 52, the various amplifications being such as to take maximum advantage of a subsequent simultaneous-sampling multichannel analog-to-digital circuit (not shown) which converts each analog signal indicative of either instantaneous current or instantaneous voltage, to a series of digital samples equally spaced in time. The digital samples are provided to a computer for storage and subsequent calculation of the total real (active) motor power, which then can be displayed as a real motor power trace, or real motor power as a function of time.

It will also be appreciated by those skilled in the art that in the presently preferred embodiment, the current and voltage probes 50, 52 are sufficient for the accurate computing of real motor power, but that other probe arrangements (not shown) could also provide an accurate real motor power trace and could therefore serve the function of the present invention. Thus, the present invention is not limited to a particular type or arrangement of probes or sensors for developing the real motor power trace as a function of time.

In a subsequent section of the specification, the stem torque trace as a function of time is discussed. The stem torque trace discussion is only for clarity and completeness of understanding. The stem torque trace as a function of time is not a part of this invention, and therefore no preferred embodiment for its measurement is indicated. Nevertheless a method for developing a stem torque trace is presented as follows. The stem torque sensor could be a strain gage wheatstone bridge consisting of one, two or four active strain gages bonded to the valve stem 24 with the active gage direction oriented 45 degrees to both the axis and the cross-sectional plane of the stem 24. This process is well known in the art. The analog electrical output of the strain gage bridge is suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer for storage, and subsequent display as a stem torque trace, or stem torque as a function of time.

Figure 3A:
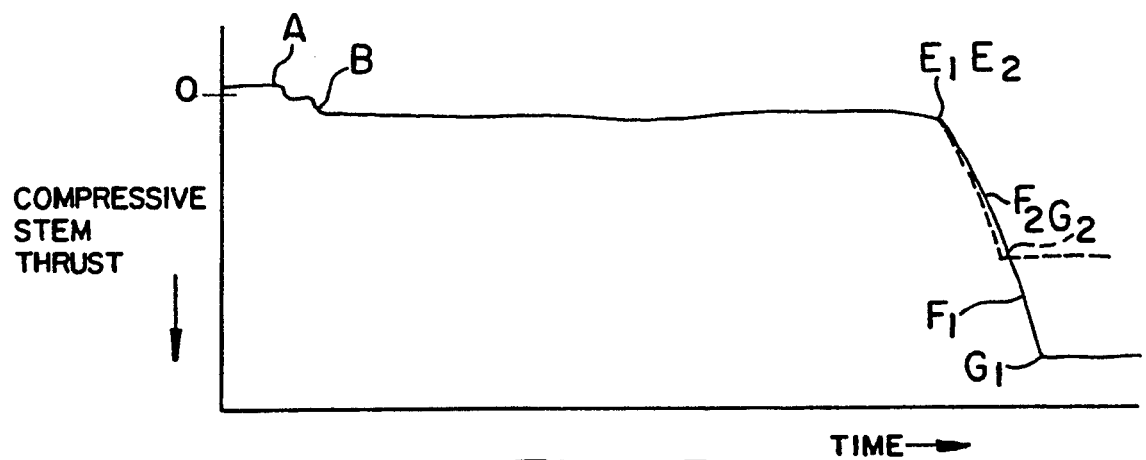
FIGS. 3a, 3b and 3c are composite graphic illustrations showing variation vs time in stem thrust, stem torque, and real motor power, respectively, during valve closure, each under zero differential pressure conditions, and each showing the case of normal stem lubrication, and the case of significantly degraded stem lubrication, accentuating for comparison purposes the seating region beyond the onset of wedging.

Typical stem thrust traces as a function of time during valve closure are shown in FIG. 3a for the closing of motor operated gate valve 10 under zero differential pressure. The solid trace (subscripts 1) of FIG. 3a is for the motor operated valve 10 with proper stem to stem nut lubrication. The dotted trace (subscripts 2) is for the same motor operated valve 10, but after significant stem to stem nut lubrication degradation. Referring to FIG. 3a, when the valve 12 first starts to close (point A), the initial stem tension due to packing force remaining from when the valve previously opened is converted into stem compression (point B) as the valve stem 24 moves into the valve 12 through the packing 25. Since there is no differential pressure forcing the valve disc 18 against the downstream seat 20a, there is no change in stem thrust until the motor operator 14 begins to wedge the valve disc 18 between the upstream and downstream seats 20a, 20b (point E). Since the motion of the valve disc 18 is substantially halted at this point, the additional valve stem thrust, termed "disc wedging force", builds up very rapidly to the toque switch trip (point F), and beyond to the maximum stem thrust (point G) because of contactor dropout time and rotary inertia. For conservative reasons, only point F, the thrust at torque switch trip, is assumed to be assured.

Figure 3B:
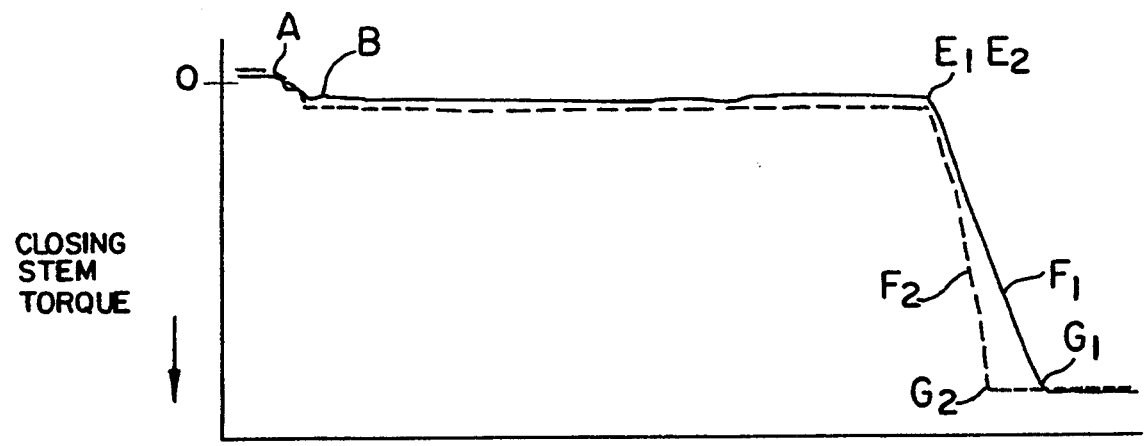
Figure 3C:
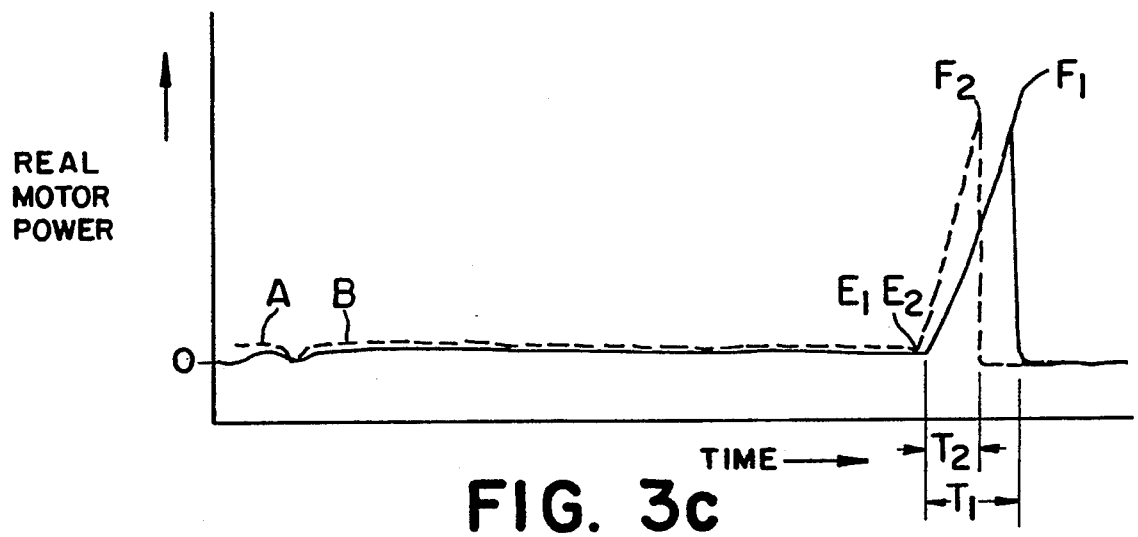

FIGS. 3b and 3c show the same two conditions for the same motor operated valve 10, except FIG. 3b shows the valve stem torque traces as a function of time and FIG. 3c shows the real motor power traces as a function of time. As in FIG. 3a, the solid trace (subscripts 1) is for the proper lubrication condition, and the dotted trace (subscripts 2) is for the lubrication degradation condition.

From FIG. 3a, the nearly halving of the stem thrust at torque switch trip (point $F_2$) due to lubrication degradation is obvious, as one might expect it would be from a stem thrust measurement. By contrast, from FIGS. 3b and 3c, the stem torque and motor power are nearly unchanged (point $F_1$ to $F_2$) at torque switch trip between the properly lubricated and lubrication degradation conditions. Tests show that stem torque and motor power actually tend to decrease just a little bit for a very significant degradation in lubrication. As a result of the near insensitivity of stem torque and motor power at torque switch trip to lubrication degradation, one may infer that only the thrust trace, obtainable only at-the-valve, is of use in detecting and measuring the dropoff in thrust due to lubrication degradation.

But a closer look at FIG. 3a shows that, for reasons which will hereinafter become apparent, despite the very significant lubrication degradation, the time rate of thrust build-up after the onset of wedging (point E) is virtually unchanged making it possible, after only one at-the-valve test, to remotely measure thrust reductions due to lubrication degradation without having to go back to the valve. It also enables one to quantify the lubrication degradation remotely in terms of percent degradation in stem factor. The recognition that this can be done and the methodology for accomplishing it are key components of the present invention.

With the stem 24 and stem nut properly lubricated, an at-the-valve initial or first test is run, where a trace of valve stem thrust as a function of time is determined (FIG. 3a). The test is typically run under zero differential pressure conditions (i.e., no fluid flowing through the valve 12). Preferably, but not absolutely necessarily, a concurrent real motor power trace as a function of time (FIG. 3c) is concurrently determined either at the valve 10 or at a remote location such as at a motor control center.

After the expiration of some period of time, some lubrication degradation may have occurred, causing a decrease or dropoff in the stem thrust at torque switch trip, and an increase in the stem factor. A second test is now run, and only the real motor power trace as a function of time (FIG. 3c) is determined, remotely, for example, at the motor control center.

From the initial (at-the-valve) test, the time between the onset of wedging (point $E_1$) and torque switch trip (point $F_1$) is determined from the stem thrust trace as a function of time (FIG. 3a) and is established as t1. The stem thrust increase from the onset of wedging to torque switch trip is established as ($F_1E_1$).

Dividing the initial thrust increase from wedging to torque switch trip ($F_1$- $E_1$) by the time t1 establishes the average rate of thrust increase after the onset of wedging in pounds per millisecond.

Then from the second (remote) test, the time between the onset of wedging (point $E_2$) to torque switch trip (point $F_2$) is determined from the real motor power trace as a function of time (FIG. 3c) and is established as t2. Multiplying t2 in milliseconds as determined in the second (remote) test by the rate of thrust increase after the onset of wedging in pounds per millisecond as determined in the initial (at-the-valve) test results in the new (i.e., post lubrication deterioration) increase in thrust from wedging to torque switch trip ($F_2$- $E_2$) in pounds.

Assuming no change in the torque switch setting, no spring pack relaxation, and no hydraulic lock, the ratio of t1 to t2 provides a good approximation of the ratio of the new (post lubrication deterioration) stem factor to the initial (well lubricated) stem factor. If the motor power trace as a function of time is also available for the first test, then these assumptions need not be made. The ratio of the new stem factor to the initial (well lubricated) stem factor can be approximated by dividing the average rate of power build-up (in watts per millisecond) after the onset of wedging in the second test, by the average rate of power build-up after the onset of wedging in the first test: Rate2/Rate1. If this ratio differs significantly from the stem factor ratio as computed from t1 over t2, then one of the indicated assumptions regarding torque switch setting, spring pack relaxation, and hydraulic lock does not hold. This information can be used diagnostically to identify which problem may be occurring. With spring pack relaxation, the torque switch will trip very early, this being recognizable when t1 over t2 is much greater than Rate2/Rate1. With hydraulic lock, the torque switch will trip very late, this being recognizable when t1 over t2 is much less than Rate2/Rate1. The torque switch setting usually will not change by itself. None of these operator problems will affect the ratio Rate2/Rate1.

In some applications, it is possible to run a test with differential pressure across the valve, if not the full differential pressure, then some partial differential pressure. It is very desirable to conduct such a test because it more closely approximates actual valve operating conditions, and assumptions such as the ones regarding the disc friction or valve factor are either no longer assumptions or at least no longer big assumptions. Under a differential pressure condition, the differential pressure force previously described causes the stem thrust to slowly increase prior to the onset of wedging. This can lead to a condition known as rate of loading, or load sensitive behavior. When the thrust builds up slowly this way prior to the onset of wedging, the thrust at torque switch trip for a fixed torque switch setting can be significantly reduced when compared to the thrust at torque switch trip in the absence of differential pressure. Clearly this is a complicating factor because a zero differential pressure test generally does not uncover this type of problem if it exists.

Figure 4A:
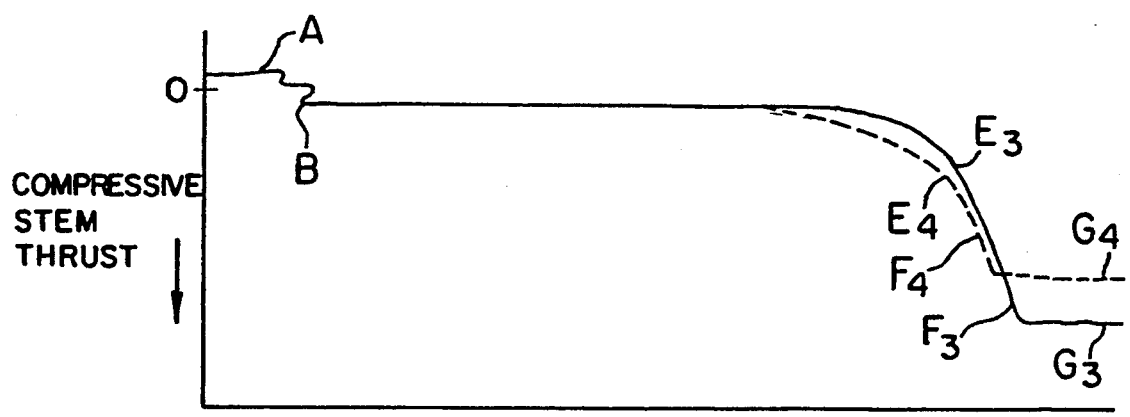
FIGS. 4a, 4b and 4c are composite graphic illustrations showing variations vs time in stem thrust, stem torque, and motor power, respectively, during valve closure, each for two different differential pressures to show the effect of a different rate of loading prior to the onset of wedging, accentuating for comparison purposes the seating region beyond the onset of wedging.

FIG. 4a shows typical stem thrust traces as a function of time for the closing of a motor operated gate valve under two different non zero differential pressure conditions. The solid trace (subscripts 3) is for a motor operated valve closing against low differential pressure. The dotted trace (subscripts 4) is for the same motor operated valve closing against high differential pressure. The illustration clearly shows that the motor operated valve has a rate of loading problem (exhibits load sensitive behavior) because the thrust at torque switch trip is significantly less for the high differential pressure condition (point $F_4$) than for the low differential pressure condition (point $F_3$).

Figure 4B:
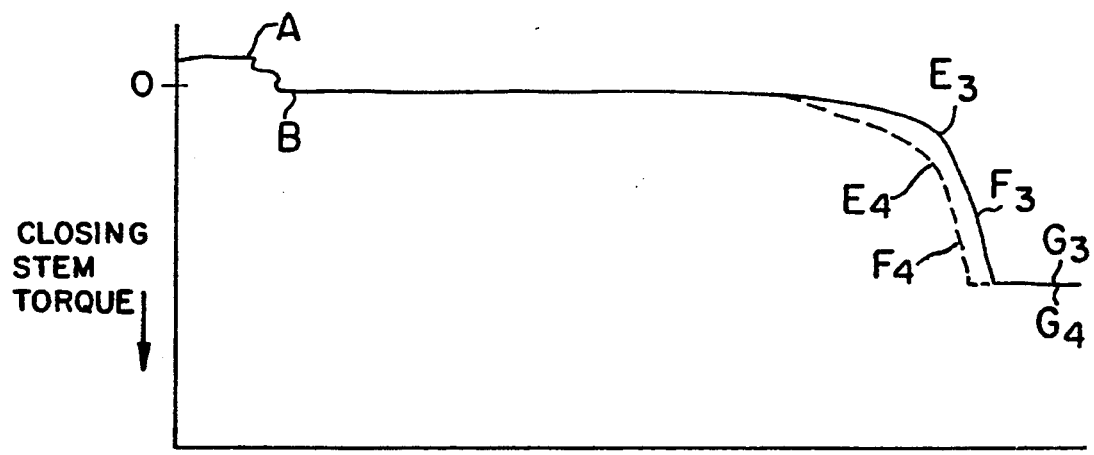
Figure 4C:
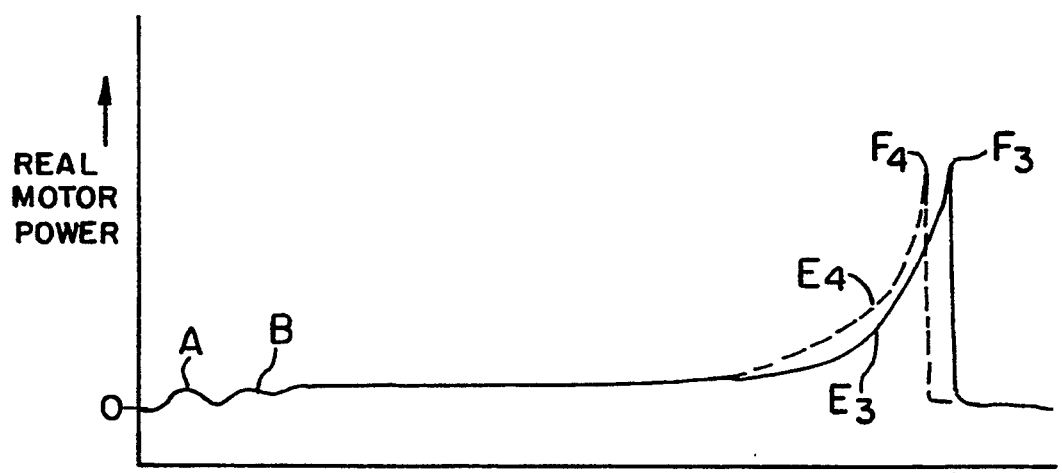

FIGS. 4b and 4c show the same two conditions for the same motor operated valve, except FIG. 4b shows the valve stem torque traces as a function of time and FIG. 4c shows the motor power traces as a function of time. As in FIG. 4a, the solid trace (subscripts 3) is for the low differential pressure condition, and the dotted trace (subscripts 4) is for the high differential pressure condition. The nearly halving of the stem thrust at torque switch trip due to the higher differential pressure (and the resulting higher load at the onset of wedging), is of course apparent from the two thrust traces of FIG. 4a. By contrast, from FIGS. 4b and 4c, the stem torque and the motor power are nearly unchanged at torque switch trip (points $F_3$ and $F_4$). As a result of this near insensitivity, one might conclude that only the thrust trace, obtainable only at-the-valve, is of use in detecting and measuring the decrease or dropoff in thrust due to rate of loading.

But a closer look at FIG. 4a shows that despite the very significant rate of loading problem, the time rate of thrust build-up (slope) after wedging (points $E_3$ and $E_4$) is virtually unchanged. As it was with zero differential pressure, the rate of thrust build-up is relatively constant once wedging begins. Furthermore, the rate of thrust build-up after wedging is the same in the non zero differential pressure condition as it is in the zero differential pressure condition. This totally unexpected and unobvious result has some very important ramifications. It makes it possible, after one at-the-valve zero differential pressure test, to remotely measure a reduced thrust increase after wedging due to a combination of lubrication degradation and a rate of loading problem. The remote measurements are preferably made at the motor control center as before. And as before, lubrication degradation is isolated using a zero differential pressure test. Then from the results of a subsequent non zero differential pressure test, the lubrication degradation effect is removed, leaving the rate of loading effect. The recognition that this can be done and the methodology for accomplishing it are key parts of the present invention.

Assume an initial at-the-valve zero differential pressure test, and a second remote zero differential pressure test as before, and all the pervious determinations and approximations. Next, in close time spacing to the second test, a third remote non zero differential pressure test is run. From the third (remote) test, the time it takes from the onset of wedging (point $E_3$) to torque switch trip (point $F_3$) is determined from the real motor power trace as a function of time (FIG. 4c) and is established as t3.

Multiplying t3 in milliseconds as determined in the third (remote) test by the rate of thrust increase after the onset of wedging in pounds per millisecond as determined in the initial (at-the-valve) test yields the new increase in thrust from wedging to torque switch trip ($F_3 - E_3$) in pounds. Since the third test is a non zero differential pressure test, this value is truly a measure of the thrust margin for the differential pressure condition.

If the motor power trace as a function of time (FIG. 3c) was also available in the first test, the average rate of power build-up after the onset of wedging (in watts per millisecond) may be computed for each test. If the average rate of power build-up after the onset of wedging in the third test is substantially equal to the average rate of power build-up after the onset of wedging in the first test, then no reduction in thrust margin occurred in the third test as a result of either lubrication degradation or rate of loading. If the average rate of power build-up after the onset of wedging in the third test is higher than the average rate of power build-up after the onset of wedging in the first test, then the thrust margin has been reduced by the ratio Rate1/Rate3. To determine how much of the total reduction in thrust margin was due to lubrication degradation, form the ratio Rate 1/Rate 2. To determine how much of the total reduction in thrust margin was due to rate of loading, form the ratio Rate2/Rate3.

The initial (at-the-valve) test is not required to determine the effect of rate of loading. Rate of loading effect can be determined from two remote tests, one under zero differential pressure conditions and one under non zero differential pressure conditions. It should be apparent also that an at-the-valve test is not required for determining stem lubrication degradation, only two remote tests, both at zero differential pressure. The two tests are not sufficient, however, for the remote determination of thrust build-up after the onset of wedging which requires the initial at-the-valve test for measuring thrust.

The reason why the stem thrust builds up at a constant rate after the onset of wedging regardless of stem to stem nut lubrication degradation, or rate of loading effects is probably related to the fact that once the stem, disc and seat are in a mechanical stackup, (as is the case at the onset of wedging), and if the motor speed is not seriously reduced, (and this is true for motor operated valve induction motors), and if the spring pack displacement is much smaller than the corresponding circumferential displacement of the worm gear, (and this is typically true), then the rate of thrust build-up is primarily determined by the combined compliances of the total mechanical structure, and this is invariant. This being the case, one might expect that similar to the use of the fixed rate of thrust build-up after wedging in the closing direction, and the time after the onset of wedging from a subsequent test, that for gate valves at least, the analogous situation should apply in the opening direction; that is the use of a similar fixed rate of thrust build-up starting with the beginning of the unwedging force until the disc cracks free of the seat, and the time after the onset of unwedging from a subsequent test.

The present invention allows operation and maintenance personnel in a plant to remotely monitor the condition of motor operated valves and more particularly, to know as a result whether the required thrust margin is being seriously jeopardized by either lubrication degradation or by a rate of loading problem. Furthermore, the invention allows plant personnel to separately quantify lubrication degradation, and a possible rate of loading effect. If a particular valve is seen to have experienced too much lubrication degradation, and as a result has insufficient thrust margin to give confidence of being able to close in the required differential pressure condition, then plant personnel may need to relubricate that valve stem. This is a very serious determination because it may require a temporary plant shutdown to accomplish this relubrication. Conversely, and equally serious from a plant performance standpoint, the information provided by the invention assures plant personnel of when they do not need to do this. If it is a rate of loading problem that is seen to jeopardize the motor operated valve's ability to close under differential pressure conditions, then plant personnel may need to change the torque switch setting to a higher setting, and as with the need for relubrication, doing this may require a temporary plant shutdown, and clearly an equally serious judgment is involved. The value of this invention is that it provides important information, heretofor unavailable, upon which to base these serious judgments.

From the foregoing description, it can be seen that the present invention comprises a method for remotely determining thrust margins and stem lubrication of a motor operated valve. It will be appreciated by those skilled in the art that changes could be made to the above-described embodiment without departing from the broad inventive concepts thereof. It is understood, therefore, that this invention is not limited to the particular embodiment disclose, but it is intended to cover all modifications which are within the scope and spirit of the invention as defined by the appended claims.

I claim:

1. A method for remotely determining thrust margin of a motor operated valve combination including a valve having a valve stem, a valve disc, a valve seat, and a motor operator having a motor drive means interconnecting the motor to the valve stem for movement of the valve disc toward and into engagement with the valve seat to close the valve and a control switch for deactivating the motor, the method comprising the steps of:

(a) sensing compressive stem thrust at the valve as a function of time during valve closing with zero differential pressure applied to the valve at a first time;
   (b) determining from the sensed information the average time rate of increase in stem thrust after the onset of valve wedging;
   (c) determining the time period from the onset of valve wedging to control switch trip at a second time which is subsequent to the first time; and
   (d) multiplying the average time rate of thrust increase established in step (b) by the time period determined in step (c) to establish the increase in stem thrust from the onset of wedging to control switch trip at the second time.

2. The method as recited in claim 1:
wherein the time period from the onset of valve wedging to control switch trip at the second time is determined by sensing a motor electrical parameter as a function of time during valve closing.

3. The method as recited in claim 1:
wherein the time period from the onset of valve wedging to control switch trip at the second time is determined by sensing real motor power of the motor as a function of time during valve closing.

4. The method as recited in claim 3:
wherein the time period is established with zero differential pressure applied to the valve.

5. The method as recited in claim 3:
wherein the time period is established with differential pressure applied to the valve.

* * * * *